United States Patent [19]

Heithoff et al.

[11] Patent Number: 4,836,775

[45] Date of Patent: Jun. 6, 1989

[54] AIR COOLED ROTARY KILN COLLAR

[75] Inventors: Robert B. Heithoff; John K. Groetzinger, both of LaVale, Md.

[73] Assignee: PPG Industries, Inc., Pittsburgh, Pa.

[21] Appl. No.: 208,193

[22] Filed: Jun. 16, 1988

Related U.S. Application Data

[60] Continuation of Ser. No. 41,262, Apr. 22, 1987, abandoned, which is a division of Ser. No. 812,039, Dec. 23, 1985, Pat. No. 4,707,175.

[51] Int. Cl.⁴ .................. F27B 7/24; F27B 7/38
[52] U.S. Cl. .................... 432/112; 432/107; 432/115; 432/103
[58] Field of Search .............. 98/41.3; 432/107, 112, 432/113, 115, 116

[56] References Cited

U.S. PATENT DOCUMENTS

| | | | |
|---|---|---|---|
| 118,674 | 9/1871 | Baynton . | |
| 939,817 | 11/1909 | Edison . | |
| 1,510,956 | 10/1924 | Perkins . | |
| 1,800,247 | 4/1931 | Buckbee . | |
| 1,861,266 | 5/1932 | Forse et al. . | |
| 1,869,237 | 7/1932 | Bruhn . | |
| 1,889,509 | 11/1932 | Amsler . | |
| 2,363,390 | 11/1944 | Buehl . | |
| 3,016,236 | 1/1962 | Alonso . | |
| 3,426,668 | 2/1969 | Hofmeister | 98/41.3 |
| 3,441,082 | 4/1969 | Fragnito et al. | 98/41.3 |
| 3,682,453 | 8/1972 | Powell . | |
| 3,703,277 | 11/1972 | Bosshard . | |
| 4,014,106 | 3/1977 | Bearce . | |
| 4,038,021 | 7/1977 | Benson | 432/112 |
| 4,102,530 | 7/1978 | Hawkes et al. . | |
| 4,185,984 | 1/1980 | Kiyonaga . | |
| 4,204,832 | 5/1980 | Miller | 110/162 |
| 4,295,825 | 10/1981 | Chielens et al. . | |
| 4,338,080 | 7/1982 | Grandcolas et al. . | |
| 4,370,128 | 1/1983 | Chielens et al. . | |
| 4,381,934 | 5/1983 | Kunkle et al. . | |
| 4,391,583 | 7/1983 | Serbent et al. | 432/4 |
| 4,519,814 | 5/1985 | Demarest, Jr. . | |
| 4,543,061 | 9/1985 | Edwards . | |

FOREIGN PATENT DOCUMENTS

PCT/US81/-
00907  3/1982  PCT Int'l Appl. .

Primary Examiner—Henry C. Yuen
Attorney, Agent, or Firm—Andrew C. Siminerio

[57] ABSTRACT

An air cooled rotary kiln collar for use in improving the delivery of preheated charge material from the rotary kiln to the second stage of a multi-stage heating process. Adjustable rate fans circulate air through an annular collar at the discharge end of the rotary kiln to remove heat from the charge material and prevent it from agglomerating and sticking to the kiln.

5 Claims, 2 Drawing Sheets

AIR COOLED ROTARY KILN COLLAR

This is a continuation of application Ser. No. 41,262 filed Apr. 22, 1987, now abandoned, which is a division of application Ser. No. 812,039, now U.S. Pat. No. 4,707,175 filed Dec. 23, 1985, and issued Nov. 17, 1987.

BACKGROUND OF THE INVENTION

1. Field of Invention

This invention relates to rotary kilns, and in particular to improving the delivery of preheated charge material from a rotary kiln to a liquefier in a multi-stage melting process. The invention is particularly applicable to preheating batch material in a glass melting operation, but is applicable to other processes that thermally convert a generally flowable, essentially solid state feed material into a molten fluid.

2a. Technical Considerations

It has long been recognized that exhaust gas from a combustion heated glass melting furnace or other melting process furnace contains large amounts of thermal energy that can be recovered to improve the overall efficiency of the process. Conventionally, regenerators and recuperators have been employed to recover heat from melting process furnaces by preheating combustion air, but their efficiency is less than desired. Instead of preheating combustion air by way of regenerators or recuperators, it has been proposed to recover waste heat by means of preheating the feed material.

The amount of waste heat from a melting furnace useable in preheating feed material is generally limited by a specific batch condition within a preheating vessel that is sought to be avoided. For example, typical batches of float glass contain sand, soda ash, limestone and dolomite, as well as other materials. When the batch is preheated in a rotary kiln and reaches a certain temperature range, the batch material will begin to agglomerate and stick to the kiln prior to its discharge into the melting furnace, resulting in clogging of the rotary kiln and the batch transfer arrangement. To avoid this condition, the components of the feed can be preheated separately and combined directly at the furnace. Such an arrangement requires additional feeders and metering devices to ensure the correct material mix in the batch. In the alternative, if all the batch constituents are combined and preheated in the same vessel, the temperature of the batch material must be maintained below the temperature that will cause agglomeration of the batch.

In U.S. Pat. No. 4,381,934 to Kunkle and Matesa, there is disclosed an intensified batch liquefying process in which large volumes of batch are efficiently liquefied in a relatively small space. This type of process, particularly when using intensified heat sources, produces relatively small volumes of high temperature exhaust gas. It would be desirable to recover the heat from the exhaust gas to further improve the efficiency of such a process and in particular, to recover the heat directly into the batch feed stream while maintaining the preheating temperature of the batch feed below the temperature that results in agglomeration and/or sticking of the batch material.

2b. Patents of Interest

U.S. Pat. Nos. 118,674 to Baynton, 939,817 to Edison; 1,510,956 to Perkins; 1,800,247 to Buckbee, 1,869,237 to Bruhn; and 3,682,453 to Powell each teach the use of cooling jackets on rotary kilns to control the temperature of the processed product within the kilns prior to discharge and/or reduce high thermal stresses and the accompanying thermal degradation of the kiln. In Baynton and Edison, the exterior of the kiln is sprayed with a water bath to cool the outer shell. In Perkins, the exterior walls of the kiln are provided with buckets to pick up water from a reservoir positioned below the kiln. As the kiln rotates the buckets pour water over the outer skin of the kiln. In Buckbee, longitudinally extending passages positioned around the perimeter of the kiln are air cooled by stationary blowers. In Bruhn, a water cooled jacket is used to reduce the temperature of the rotary furnace at its sintering zone. In Powell, longitudinal passages are supplied with cooling air to protect the discharge end of the kiln from excessive heat.

U.S. Pat. No. 1,861,266 to Forse et al. teaches a method of controlling the rate of cooling in a kiln after it has been subjected to the maximum temperature of the kiln. Cooling air is blown into air ducts positioned in the refractory walls and ceiling.

U.S. Pat. No. 2,363,390 to Buehl teaches a method of cooling sponge iron before it is discharged from a rotary kiln into the air to minimize oxidation. The sponge iron is deposited from the kiln into a pipe coiled around the kiln outlet. The pipe with the hot sponge iron is cooled by a water spray while the pipe is partially submerged in a water reservoir.

U.S. Pat. No. 3,703,277 to Bossard teaches the use of longitudinally extending closed boiler tubes positioned generally in the direction of the kiln axis of rotation at the kiln outlet. Liquid in the hot region of the tubes is acted upon by the heat from the kiln and is evaporated. The vapor condenses in the cold region of the tube giving up its heat to the surrounding atmosphere.

U.S. Pat. No. 4,102,530 to Hawkes et al. teaches an annular cooling coil surrounding the discharge end of a rotary furnace. Cooling fluid is continuously circulated from a delivery trough through the coil to a collecting trough.

U.S. Pat. No. 4,391,583 to Serbent et al. teaches a method of Preventing crusting of charge components on the refractory surface of a rotary kiln. Heat is reduced in several sections of the kiln so that the temperature of the inside surface of the kiln that is submerged under the charge is always 122° F. (50° C.) or less cooler than the charge. Cooling of the inside of the surface is effected by sprinkling water on sections of the kiln's outer shell, or by means of cooling pipes which are installed in the refractory lining of the kiln. The temperature of the inside surface of the kiln is measured at several points and the dissipation of the heat along the length of the kiln is adjusted accordingly.

SUMMARY OF THE INVENTION

The purpose of this invention is to provide a method of preheating pulverulent material as it advances through a preheating zone into a heating zone, by exposing the material to hot exhaust gas from the heating zone while within the preheating zone. Heat is extracted from preheated material by a cooling collar positioned at the discharge end of the preheating zone to prevent the material from reaching a predetermined temperature. Air is circulated through an annular chamber in the cooling collar by adjustable rate blowers. In one embodiment, the pulverulent material is glass batch material and the predetermined temperature is the temperature at which the material will agglomerate.

Another purpose of the invention is to provide a heat exchanger for maintaining the temperature of preheated pulverulent material at or below a predetermined temperature, such as its agglomeration temperature at the discharge end of a rotary kiln. The exchanger includes an outer cylindrical shell and a coaxially disposed inner cylindrical wall with a refractory liner position therebetween so as to form an annular chamber between the liner and inner wall. Adjustable rate blowers blow air into air inlets, through the chamber, and out the air outlets.

The present invention provides control of the preheat temperature of batch material by allowing it to be preheated to as high a temperature as possible without adversely affecting the overall heating process. By changing the flow rates of ambient air through the heat exchanger, the present invention can adjust for variations in firing rates in the heating zone which in turn varies the conditions of the exhaust gas. The changes in flow rates directly affect the preheating by the exhaust gas without bleeding out exhaust gas or injecting ambient air into the exhaust stream.

DETAILED DESCRIPTION OF THE INVENTION

Figure 1:
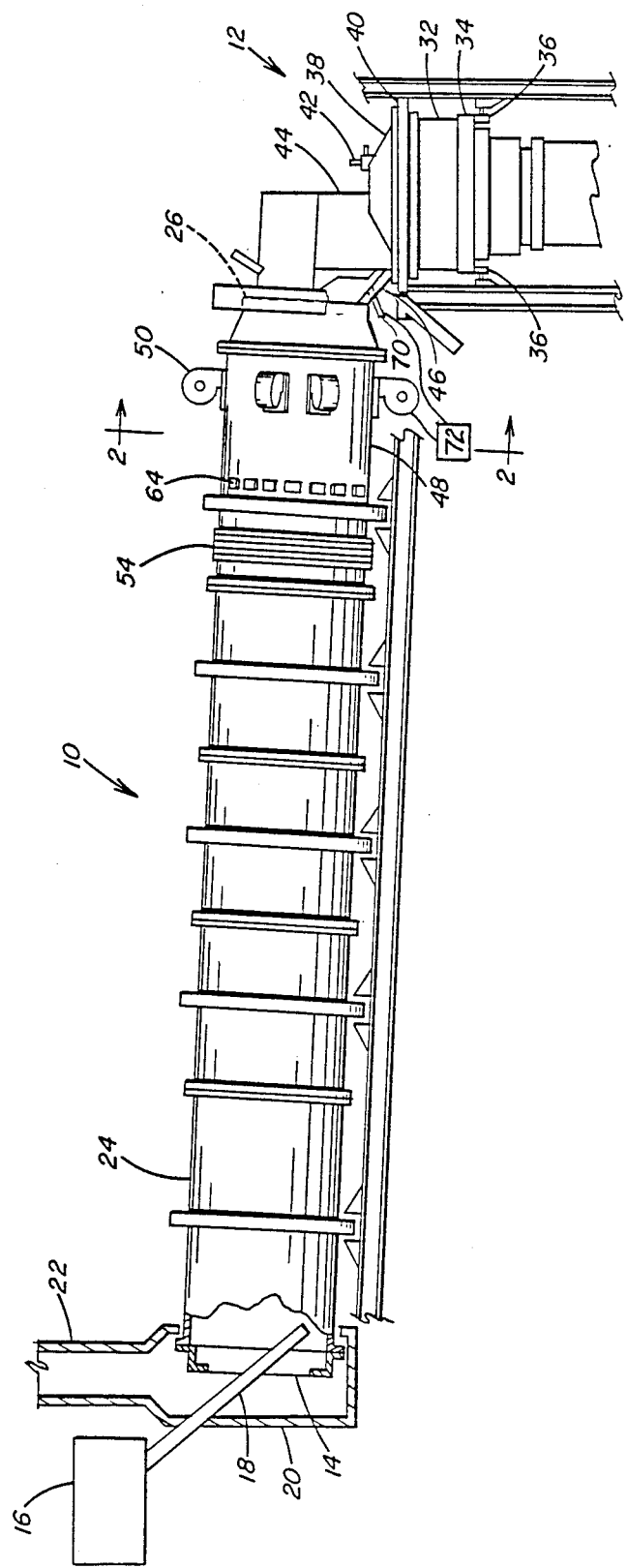
FIG. 1 is an elevation view of a two-stage batch liquefaction arrangement with a rotary kiln in accordance with a preferred embodiment of the present invention.

The invention is preferably used in preheating batch material in a two-stage batch liquefaction process as disclosed in commonly assigned U.S. Pat. No. 4,519,814, which teachings are hereby incorporated by reference.

In a two-stage batch liquefaction process, batch is transported relatively slowly in a first zone as it is heated to a temperature approaching incipient liquefaction. The batch is then transferred to a second zone where the preheated batch is deposited onto a sloped surface and rapidly liquefied by intense heating. The liquefied batch flows out of the second zone into a collecting vessel. This two-stage process separates the batch liquefaction operation into a preliquefaction stage and a liquefaction stage and provides each stage with conditions that maximize the efficiency of each stage. In the first zone where the preliquefaction stage occurs, there are no essential time restraints in transferring heat to the batch as long as the batch remains free flowing. Therefore, the vessel in the first zone may be relatively extensive in size, may utilize relatively low temperature heat and Preferably provides agitation to the batch in order to heat the batch throughout. The second zone where the liquefaction stage occurs, is adapted to apply intense heat to the batch in a relatively small space to rapidly convert the batch to a liquefied state. Support for the batch in the second stage is steeply sloped so as to enhance rapid runoff and high throughput thereby minimizing the size of the intensely heated second zone. The first zone preferably employs waste heat from the second zone. Batch is conveyed through the first zone, preferably at a relatively slow rate so as to maximize transfer of heat from the exhaust gas to the batch. The relatively slow material transport in the first zone can be maintained only so long as the batch remains free flowing. If the batch temperature approaches the melting point of one of its constituents, e.g., through creation of a liquid phase, there may be cohesion between batch particles which, in turn, may result in detrimental agglomerating of the batch which can cause adhesion to the preliquefaction vessel of the first zone or plugging of the batch transfer arrangement. Therefore, as the batch approaches this condition, the batch must be transferred to the steeply sloped support of the second zone and rapidly brought to a liquefied state.

Preheating batch materials in accordance with the present invention is particularly advantageous in combination with the ablation enhancing batch liquefying arrangements as described in U.S. Pat. No. 4,381,934, which teachings are hereby incorporated by reference. Preheating batch reduces the heat requirement for liquefying the batch and yields a greater throughput in the melter. The batch liquefaction arrangements of U.S. Pat. No. 4,381,934 which are adapted to enhance the runoff of liquefied batch by providing a sloped melting surface and rapid draining of the liquefied material are particularly well suited to take advantage of the higher throughputs that can be achieved by batch pretreating. Second zone embodiments such as those taught in U.S. Pat. No. 4,381,934, wherein a layer of batch encircles the heat source, are well suited for use with high temperatures produced by oxygen fired combustion. Oxygen firing in such an arrangement produces a relatively small volume, high temperature exhaust gas as compared to conventional glass melting furnaces and this small volume, higher temperature exhaust gas stream is particularly well suited for heat recovery and preheating of the batch material. Other high temperature heat sources that substantially reduce the volume of $NO_x$ pollutants from the exhaust stream also lend themselves to the invention.

FIG. 1 shows a rotary kiln 10 as it feeds batch material to a liquefaction vessel 12. Batch material is fed into the inlet or cold end 14 of the kiln from a continuous weighing and metering device 16 through delivery tube 18.

The open end of the rotary kiln 10 at the cold end 14 is enclosed by an exhaust box 20 which directs exhaust gases leaving the rotary kiln 10 to a duct 22. The duct 22 may lead to a fan (not shown) which provides the draft for drawing the exhaust gases through the rotary kiln 10 and for discharging the exhaust gas to the atmosphere through a stack (not shown).

Figure 2:
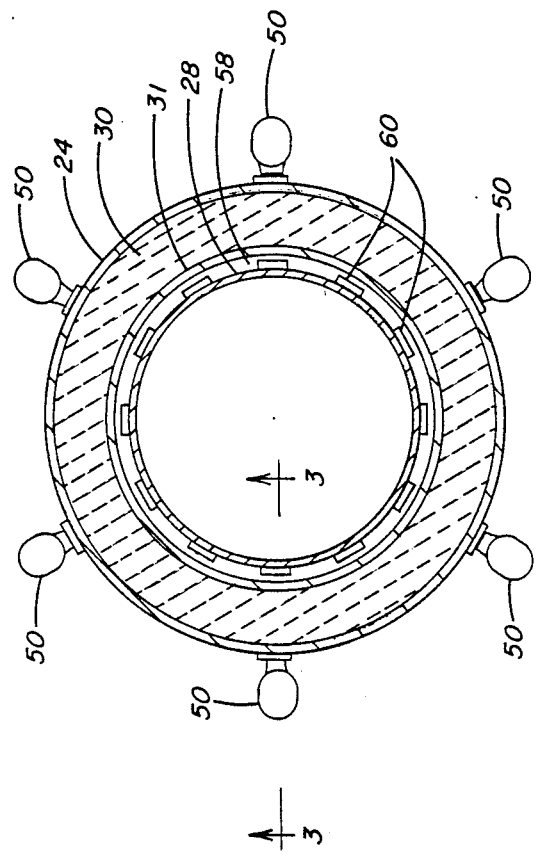
FIG. 2 is a cross sectional view of the kiln taken through line 2—2 of FIG. 1.

The rotary kiln 10 is generally of conventional design, consisting basically of a cylindrical steel shell 24 mounted for rotation about the cylindrical axis which is inclined slightly downward from horizontal so as to convey the batch material from the cold end 14 towards the hot end 26 of the rotary kiln 10 by gravity and tumbling. Referring to FIGS. 1 and 2, the interior wall 28 of the rotary kiln 10 is generally wear resistant metal, e.g., stainless steel plate, and may include lifters or baffles (not shown) to help mix and agitate the batch material as it moves through the length of the kiln 10. The shell 24 and interior wall 28 are generally separated by an insulating refractory liner 30 and metal liner 31.

The liquefaction vessel 12 is of the type similar to that disclosed in U.S. Pat. No. 4,381,934 and is comprised of a steel drum 32 supported on a circular frame 34 which is, in turn, mounted for rotation about a generally vertical axis corresponding to the centerline of the drum on a plurality of supporting and aligning rollers 36. An opening (not shown) at the base of the drum 32 provides the outlet opening from the liquefaction vessel 12. An upwardly domed refractory lid 38 is provided with stationary support by means of circular frame member 40. The lid 38 also includes one or more burners 42. The burners 42 are preferably a wide angle multi-port burner and is preferably fired with oxygen and gaseous fuels such as methane.

Exhaust gases escape upwardly through the opening (not shown) in the lid 38 and into an exhaust duct 44. The exhaust duct 44 directs the escaped gas from the lid 38 to the hot end 26 of the rotary kiln 10 where it is used to preheat the batch material. Batch materials are fed into the liquefaction vessel from the hot end 26 of the rotary kiln 10 through the opening (not shown) and a feed chute 46 is provided for this purpose.

Figure 3:
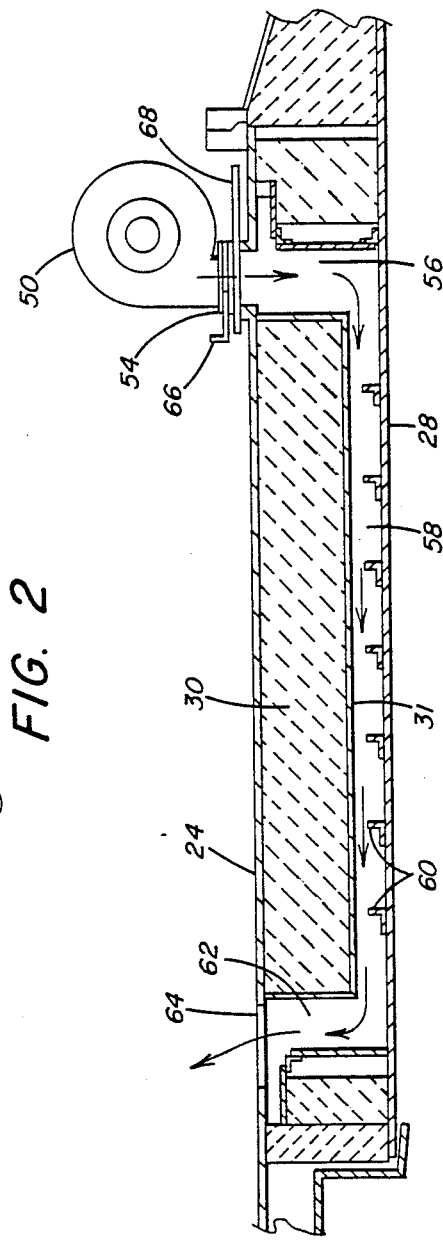
FIG. 3 is a cross sectional view of the kiln wall taken through line 3—3 of FIG. 2.

The heat exchanger 48 of the present invention is located at the hot end 26 of the rotary kiln 10. Referring to FIGS. 2 and 3, a specific preferred embodiment is shown, wherein blowers 50 are circumferentially positioned around the hot end 26. The blowers 50 are adjustable and can vary the volume of ambient temperature air passing through the heat exchanger 48 in the direction indicated by the arrows in FIG. 3. Power is provided to the blower 50 by a slip ring arrangement 52 in a manner well known in the art. The air passes from the blowers 50 through a blower mounting collar 54 and into an entry chamber 56. The air next passes through annular chamber 58 between the inner wall 28 and the metal liner 31. The insulating refractory liner 30 maintains the internal heat within the kiln 10 by reducing heat loss, and it is understood that other types of insulating material can be used. The chamber 58 extends axially back from the hot end 26 towards the cold end 14 a distance equal to that needed to provide the required heat transfer. Optionally, protuberances 60 in the chamber 58 may distribute the air flow to create turbulence in the air flow and improve the heat transfer through the interior wall 28. The heated air leaves the heat exchanger 48 through an exit chamber 62 and an opening 64 in the outer shell 24. It should be noted that the chamber 58 lies between the interior wall 28 and the refractory liner 30. As a result, if no cooling of the batch material is desired, the refractory liner 30 operates to maintain the preheating temperatures at the hot end 26 and insulate the outer shell 24.

The blower mounting collar 54 may include a slide gate 66 which operates either alone or in conjunction with the blower 50 to regulate the air flow through the heat exchanger 48. The collars 54 also may include heat shield 68 to protect the individual blowers 50 from the high temperatures at the hot end 26 of the rotary kiln 10 due to the heat exchanger 48 acting as a heat sink for the liquefaction vessel 12. By opening or closing the slide gates 66 and/or varying the speed of the blowers 50 the heat transfer in the heat exchanger 48 can be controlled to cool the hot end 26 only enough to prevent agglomeration and sticking in the rotary kiln 10.

It is understood that other blower arrangements can be used to supply air to the chamber 58. For example, air could be supplied by stationery blower positioned near the kiln 10 with ducting supplying the air to an air intake manifold mounted on the heat exchanger 48. In addition, the blowers 50 can be arranged to blow air through chamber 58 from left to right rather than right to left as shown in FIG. 3.

The following example is provided to illustrate how the heat exchanger 48 operates to maintain a constant throughput in a two-stage liquefaction process. A typical batch formula employed in commercial manufacture of flat glass is as follows:

| INGREDIENT | PARTS BY WEIGHT |
| --- | --- |
| Sand | 1000 |
| Soda Ash | 313.5 |
| Limestone | 84 |
| Dolomite | 242 |
| Rouge | 0.75 |

Oftentimes, crushed cullet is added to the batch material. Also, other mineral sources or materials, e.g., sodium sulfate for a refining aid, are sometimes employed as alternatives or additives. This batch formula yields approximately the following glass:

| | | |
| --- | --- | --- |
| $SiO_2$ | 73.10% | by weight |
| $Na_2O$ | 13.75% | by weight |
| $CaO$ | 8.85% | by weight |
| $MgO$ | 3.85% | by weight |
| $Al_2O_3$ | 0.10% | by weight |
| $Fe_2O_3$ | 0.10% | by weight |

When the firing rate of the liquefaction stage produces exhaust gas for preheating such a batch formula in the vicinity of 1200° F. (650° C.), it has been found that portions of the batch may adhere to the interior wall 28 of the kiln 10 at the hot end 26. To maintain proper throughput and prevent clogging of the rotary kiln 10, the temperature of the batch during preheating at the hot end 26 is preferably maintained below its "sticking temperature." The blowers 50 and slide gates 66 are adjusted to circulate the proper amount of air through the heat exchanger 48 so as to remove excess heat to preferably maintain the preheating temperature of the batch to as high a temperature as possible without resulting in any detrimental sticking of the batch material. The batch temperature for the above batch formula, at the hot end 26 of the kiln 10 is maintained preferably below 1200° F. (650° C.) and preferably at approximately 1100° F. (593° C.) or less. The temperature of the exhaust gas throughout the kiln 10 is preferably sufficient to keep all the batch material dry so as to prevent it from sticking or caking due to moisture.

Depending on the constituents of other batch mixtures, the preferred preheating temperature may vary. The individual components of a different batch may soften, melt, react, etc. at a temperature different from that previously discussed, resulting in different sticking temperature for each batch mixture.

Although the present invention has been disclosed in conjunction with a two-stage glass liquefaction process, and specifically to maintain the batch material in a granular rather than allow it to become cohesive prior to being introduced into the second stage, the invention may have applicability in other heating processes where excessive temperatures pose a different problem. For example, premature volatilization of additives in a heating process may present a condition that an operator wants to avoid. The blowers 50 and/or slide gates 66 could be adjusted to circulate sufficient air through the chamber 58 to maintain the material heating level below the volatilization temperature.

The present invention teaches a balancing of the heat from the exhaust gas of the second stage of a two-stage heating process with the amount of heat to be removed from the kiln 10 to maintain a predetermined temperature in the batch at the hot end 26. Once a condition to be avoided is known, the blower rates and slide gate positions required for the corresponding heat exchange rate can be readily determined and adjusted to avoid the condition.

The present invention provides advantages over the practice of bleeding out exhaust gas or cooling the bulk of the exhaust gas by injecting ambient temperature air into the second stage exhaust stream. Systems that bleed out exhaust gas require additional ducting and fans for the gas removal. In addition, the removed gas still must be treated. Systems that inject ambient air into the exhaust stream inherently increase the air flow through kiln 10 and thus increase dusting of the batch material. As a result, more particulates will have to be removed from the exhaust stream. Furthermore, the increased stream velocity will require modification to the post kiln processing of the exhaust gas. For example, the pressure drop across the bag house (not shown) used to filter out the particulates increases requiring larger bag house fans to service the system. If the volume of exhaust gas and ambient air is too great, a larger bag house facility may be required. The present invention allows the entire exhaust stream to pass through the kiln 10 without removing any exhaust gas or adding any ambient air to the system.

The present invention also provides flexibility to account for variable efficiency of the second stage of the heating process. Variations in the burner firing rates results in varying hot gas exhaust rates and temperatures. Rather than bypassing the kiln by bleeding out hot exhaust gas or cooling the bulk of the exhaust gas by bleeding in ambient temperature air to the second stage exhaust stream, the blower 50 and slide gates 66 of the present invention provide the flexibility to directly adjust the heat transfer at the hot end 26 of the kiln 10 in the two-stage heating process so that the overall liquefaction process -operates more efficiently. Because the heat exchange occurs in the batch material at the interior wall 28 of the kiln 10, the majority of the hot exhaust gas is unaffected by the heat exchanger 48. Thus the exhaust gas can move towards the cold end 14 of the kiln 10 and preheat heat batch material in other portions of the kiln 10 with limited heat loss due to the heat exchanger 48. Thermocouples 70 can be added at the hot end 26 of the kiln 10 to monitor batch material temperatures and automatically control via controller 72 to maintain batch temperature at a set point.

The ability of the present invention to adjust to the process materials and operating conditions is also due partly to the use of air as the cooling fluid. When compared to water as a heat exchanging medium, air can be utilized within a wide range of temperatures and remain within its gas phase. As a result, there is no limit on the temperature change in the cooling air. Water will change phases when it reaches 212° F. (100° C.) unless it is pressurized. In addition, air does not require the complex piping and watertight seals that would be required for a comparable water cooled system. As a result, the corresponding heat transfer in the air cooled system is not subject to the limitations of a water cooled system and is also variable so as to provide greater flexibility in controlling the batch material temperature.

Cooling rates can be varied by changing the air volume passing through the heat exchanger 48.

The forms of the invention shown and described herein, represent illustrative embodiments and it is understood that various changes may be made without departing from the scope of the invention.

We claim:

1. A heat exchanger for controlling the temperature of preheated pulverulent material at the discharge end of a rotary kiln comprising:
    an outer cylindrical shell with a radially inwardly disposed cylindrical inner wall;
    a refractory liner disposed radially outward from said wall and between said shell and said wall so as to form a longitudinally extending annular chamber between said liner and said wall;
    cooling air inlets at a first end of said chamber;
    cooling air outlets at a second end of said chamber longitudinally opposed from said inlet;
    at least one blower to blow cooling air into said inlet such that said air passes through said chamber and exits said heat exchanger through said outlets wherein said air extracts heat from said material;
    means to monitor the temperature of said material; and
    a slide gate positioned between said blower and said air inlets such that said slide gate can regulate air flow into said air inlets so as to maintain said material below a temperature at which portions of said material will agglomerate prior to discharge from said rotary kiln.

2. A heat exchanger for controlling the temperature of preheated pulverulent material at the discharge end of a rotary kiln comprising:
    an outer cylindrical shell with a radially inwardly disposed cylindrical inner wall;
    a refractory liner disposed radially outwardly from said wall and between said shell and said wall so as to form a longitudinally extending annular chamber between said liner and said wall;
    cooling fluid inlets at a first end of said chamber;
    cooling fluid outlets at a second end of said chamber longitudinally opposed from said inlets;
    means for introducing cooling fluid into said inlets such that said fluid passes through said chamber and exits said heat exchanger through said outlets wherein said cooling fluid extracts heat from said material;
    means to monitor the temperature of said material;
    a slide gate positioned to regulate flow of said cooling fluid through said chamber so as to maintain said material below a temperature at which portions of said material will agglomerate prior to discharge from said rotary kiln; and
    means responsive to said temperature monitoring means to control said introducing means.

3. A heat exchanger as in claim 2 wherein said cooling fluid is air and further wherein said introducing means includes means to blow air into said chamber through said inlets.

4. A heat exchanger as in claim 3 wherein said blowing means includes at least one blower.

5. A heat exchanger as in claim 4 wherein said blower is an adjustable speed blower and said responsive means further includes means to control said blower so as to vary the amount of air blown through said chamber.

* * * * *